United States Patent [19]

Ninomiya et al.

[11] 4,411,407
[45] Oct. 25, 1983

[54] BALL VALVE ASSEMBLY

[75] Inventors: Youichi Ninomiya; Kazuhiko Tsuno, both of Nobeoka, Japan

[73] Assignee: Asahi Yukizai Kogyo Co., Ltd., Nobeoka, Japan

[21] Appl. No.: 340,491

[22] Filed: Jan. 18, 1982

Related U.S. Application Data

[63] Continuation-in-part of Ser. No. 253,539, Apr. 13, 1981, abandoned, which is a continuation of Ser. No. 91,807, Nov. 6, 1979, abandoned.

[51] Int. Cl.$^3$ ............................................. F16K 5/06
[52] U.S. Cl. ................................. 251/315; 277/207 R
[58] Field of Search ........................ 251/315, DIG. 1; 277/207

[56] References Cited

U.S. PATENT DOCUMENTS

| | | | |
|---|---|---|---|
| 2,547,185 | 4/1951 | von Bolhar | 277/207 |
| 3,047,007 | 7/1962 | Lunken | 251/315 |
| 3,347,517 | 10/1967 | Scaramucci | 251/315 |
| 3,394,916 | 7/1968 | Birr | 251/315 |
| 3,397,861 | 8/1968 | Scaramucci | 251/315 |
| 3,437,106 | 4/1969 | Mueller et al. | 251/315 |
| 3,463,451 | 8/1969 | Treadwell | 251/315 |
| 3,635,439 | 1/1972 | McNally | 251/315 |
| 3,744,755 | 7/1973 | Gary, Jr. et al. | 251/315 |
| 3,940,107 | 2/1976 | Allenbaugh, Jr. | 251/315 |
| 3,961,770 | 6/1976 | Wrasman | 251/315 |
| 4,072,161 | 2/1978 | Schoeneweis et al. | 251/315 |
| 4,157,170 | 6/1979 | McClurg | 251/315 |

*Primary Examiner*—Martin P. Schwadron
*Assistant Examiner*—James R. Shay
*Attorney, Agent, or Firm*—Fleit, Jacobson, Cohn & Price

[57] ABSTRACT

The invention relates to a disposable ball valve assembly mainly composed of a ball valve member made of a plastic resin material, a valve stem made of a plastic resin material and coupled with the ball valve member, and a valve body having a valve cavity formed therein for movably mounting the ball valve member. For improving the disposability, the valve body is substantially composed of a first body element made of a plastic resin material and having a portion thereof shaped to define a female connection, and a second body element made of a plastic resin material and having a portion thereof shaped to define a male connection inserted into the female connection. These first and second body elements are permanently coupled and rigidly interconnected to each other by these two connections with the end of the male connection being spaced from an interior portion of the first body element to define therebetween a valve chamber holding the ball valve member for the establishment of the disposability. These first and second body elements have non-threaded and inwardly reducedly stepped bores formed therein. The ball valve member is rotatable for fluid flow on-off control. Portions of these body elements define the valve chamber. The ball valve member, sealing ring means sealingly coacting therewith, the valve stem, O-ring(s) serving as sealing means between the valve stem and the valve body are positioned therein in an unseparable manner from the valve body for attaining the disposability.

5 Claims, 7 Drawing Figures

BALL VALVE ASSEMBLY

CROSS-REFERENCE OF RELATED APPLICATION

This application is a continuation-in-part application of our co-pending application Ser. No. 253,539 filed Apr. 13, 1981, now abandoned, as a continuation application of Ser. No. 91,807 filed Nov. 6, 1979, now abandoned, by the same inventors.

BACKGROUND OF THE INVENTION

This invention relates to improvements in and relating to plastic resin-made ball valves.

Plastic-made ball valves are nowadays broadly used in piping systems.

With raise and increase in labor cost, especially those consumed in maintenance and repairing jobs, it is a sincere desire among those skilled in the art to provide improved ball valves providing an assured and accentuated disposability.

Thus, it is an object of the invention to provide a resin-made ball valve assembly having an assured and accentuated disposability thereof.

It is a further object of the present invention to provide an improved ball valve assembly providing an accentuated easiness in its parts assemblying job.

It is a still further object to provide a ball valve assembly having an improved seal performance.

This and further, objects, features and advantages of the invention will become more apparent as the description proceeds with reference to the accompanying drawings.

SUMMARY OF THE INVENTION

In the present invention, the ball valve assembly comprises mainly a ball valve member of a plastic resin material; a valve stem made of a plastic resin material and coupled with the said ball valve member; and a valve body having a valve cavity formed therein for movably mounting the said ball valve member.

The valve body comprises a first body element of a plastic resin material and having a portion thereof shaped to define a female connection; and a second body element made of a plastic resin material having a portion thereof shaped to define a male connection inserted into the said female connection.

These first and second body elements are permanently coupled and rigidly interconnected to each other by said connections with the end of the male connection being spaced from an interior portion of the said first body element to define therebetween a valve chamber holding the said ball valve member. The first and second body elements have non-threaded and inwardly reducedly stepped bores formed therein, for providing a smooth fluid flow and a better on-off controlability of the fluid flow. The ball valve member is rotatable between a first position in which a bore formed therein permits fluid flow between the bores formed in the body elements and a second position in which the ball valve member blocks fluid flow between the bores formed in the body elements. Portions of the said body elements defining a valve chamber have ring grooves recessed therein concentric with the bores formed in the body elements.

The valve stem is coupled with the ball valve member in a non-separable manner, thus these three mutually cooperating main valve parts are not separable from each other so as to provide the basic disposable nature of the valve assembly. For assuring complete disposability, a valve operating handle may be permanently attached to top of the valve stem or spindle.

For better and lighter valve operating possibility and nevertheless an improved sealing performance, each of the seals comprises a first seat ring positioned in the ring groove formed in the second body element. These seat rings have portions thereof directly and resiliently contacting the ball valve member in limited circumferentially areas to exert sealing and floating pressures against the ball valve member that are directed substantially towards the center of the ball valve member.

These seal rings as well as O-ring(s) provided for sealing the valve stem can not be taken out from respective working positions, so as to assist the desired disposability.

One of the seal ring elements may preferably be formed with at least one projection parallel to the direction of overall fluid flow passage formed in the valve assembly, so as to abut against the vertical wall portion of the ring groove, for establishing thereby an accentuated fluid seal performance.

DETAILED DESCRIPTION OF THE INVENTION

Figure 1:
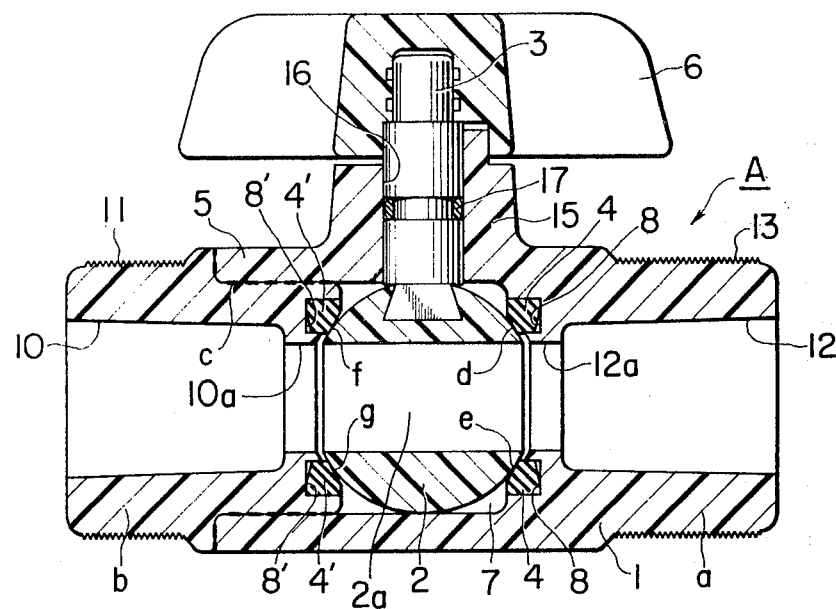
FIG. 1 is a longitudinal section of a preferred embodiment of the valve assembly of the present invention.

In the following, with reference to FIGS. 1-3, a preferred embodiment of the invention will be described in detail.

A valve body "A" is composed originally of a male element b having an outwardly enlarged, concentric and non-screwed stepped bores 10 and 10a for providing part of fluid passage. This male element b is provided with outside male threads 11 adapted for screw connection with a female-threaded end of a fluid piping, not shown. In the similar way, the valve body "A" includes originally a female element a which is similarly formed with a stepped bores 12 and 12a and outer male threads 13. The conjointing male-female, non-threaded surfaces, only shown by single dotted line c, of these both elements a and b, are rigidly united together at the final stage of the valve assembly job, as will be later more fully described. The unification of these valve body elements is made so rigid that they can not be re-separated from each other without destroying the valve body configuration, so as to provide the desired disposability. For this unification, an application of adhesive is most recommendable. However, fusion, welding or thermal conjointing technique may be employed if desired. These two valve body elements a and b have been made of a common synthetic resin, preferably polyvinyl chloride and relying on the injection molding technique.

Valve body elements a and b are formed with opposite and concentric ring grooves 8 and 8', respectively, each of the latter having nearly the rectangular sectional form and receiving therein snugly a seat ring 4 or 4' made of elastic rubber or elastomer. The concentricity is made naturally relative to the fluid passage bore elements 10; 10a and 12; 12a, respectively.

Seat rings 4 and 4' made of elastic rubber or elastomer are inserted in position in ring recesses 8 and 8' of the body elements a and b, respectively, before the assembly of the body elements a and b which are so shaped that a cavity or valve chamber 7 is formed at the central portion of the valve body A upon completion of the assembly. In this valve chamber 7, the valve member per se or the working portion of the valve member 2 is totally encased or positioned rotatably, before the execution of the said valve body assembly job. After the execution of the assembly job, however, seat rings 4 and 4' can not be taken out from the valve cavity 7 in order to assure the disposability of the valve assembly.

The valve body A is formed integrally with a vertical stem-like projection 15 having a vertical bore 16 formed at right angles to fluid passage bore elements 10; 10a and 12; 12a and in fluid communication with the valve cavity 7.

A valve stem 3 passes through vertical bore 16 and is mechanically connected at its inner end with the valve member in a tongue-and-groove mode. This mechanical connection is executed naturally before the valve body assembly job. After the assembly job, the stem can not be taken out from the valve cavity. This feature tells the valve operator or the like person of the disposable nature of the valve assembly. 17 represents an O-ring which assures a positive seal between stem 3 and bore 16, and can not be displaced from its service position. At the top end of the stem, an operating handle 6 is detachably attached.

However, this handle 6 may most preferably be attached rigidly to the stem, for increasing the desired disposablity, as by the application of an adhesive. When the operator finds this permanent connection between the both, he will find a reliable measure of the disposable nature of the valve assembly.

When, however, the undisposable connection between the stem and handle is employed, conventional motor—or electromagnet—driving automatic operating unit can be attached in place of the said handle, after displacing the latter from position.

Figure 2:
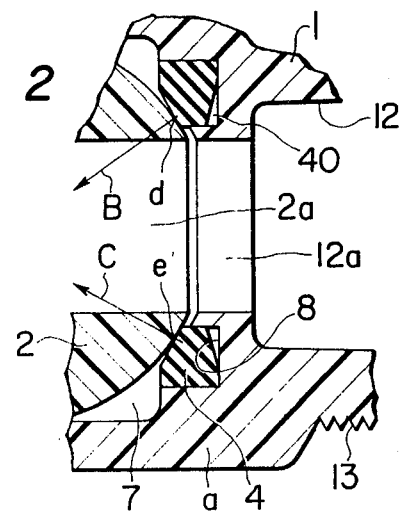
FIG. 2 is an axial section of a seat ring and part of several related constituents employed in the assembly shown in FIG. 1.

As seen, the valve member is kept in direct and sealing contact with valve seat rings at four limited small areas as at d, e, f and g, when seen in any axial section of the body valve assembly A, as may be well supposed from FIG. 1. At these contacting areas, substantially centrally and inwardly-acting valve-holding and sealing pressures are exerted upon the valve member. The provision of small ring gap spaces as at 40 provided behind the seat rings serves for increasing the elasticity thereof. These four pressures are substantially balanced out practically relative to the center of the valve member. In this way, the latter is kept in nearly floating condition. Thus, even in the large size valve, say of 4-inches, the valve stem 3 together with its handle 6 and valve member 2, can be easily and lightly operated. In fact, this light valve-operating characteristic is substantially flat, as shown in FIG. 3 at II relative to I, the latter showing the valve operating efforts met with conventional and comparative valve assemblies.

Recommendable shore hardness of the seat rings may preferably extend from 60 to 95. As the material for these seats, natural or synthetic rubber can be used. As the latter, chloroprene rubber and ethylene propylene terpolymer rubber are most suitable. For increasing the lubricating performance of the seat rings, molybdenum disulfide may be compounded together.

It should be noted that if the valve body and the like elements so far shown and described are made detachable from each other, the aforementioned floating characteristic may be occasionally lost upon reconnection thereof. Thus, this feature may be derived from the said disposability.

Figure 3:
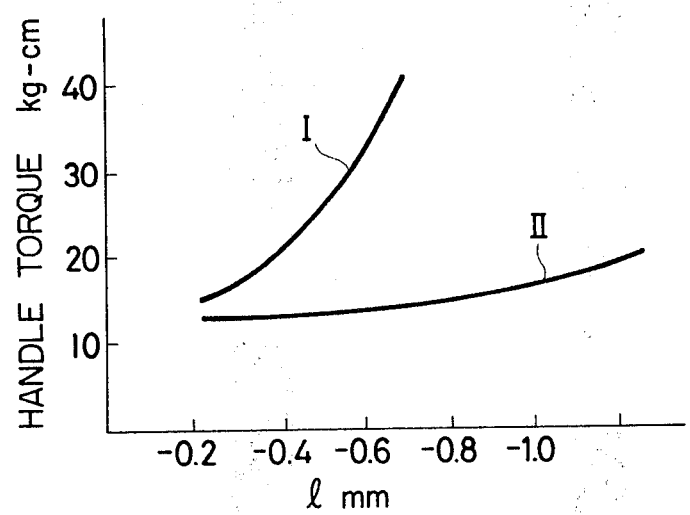
FIG. 3 is a comparative chart showing how the valve-manipulating effort is smaller than the conventional one.

The curve II shown in FIG. 3 was obtained with conventional valves using PTFE-seat rings.

This distance "1" shown in FIG. 3 denotes the distance between the both valve seat rings as measured in their practically mounted position and between the outermost parts thereof.

Figure 4:
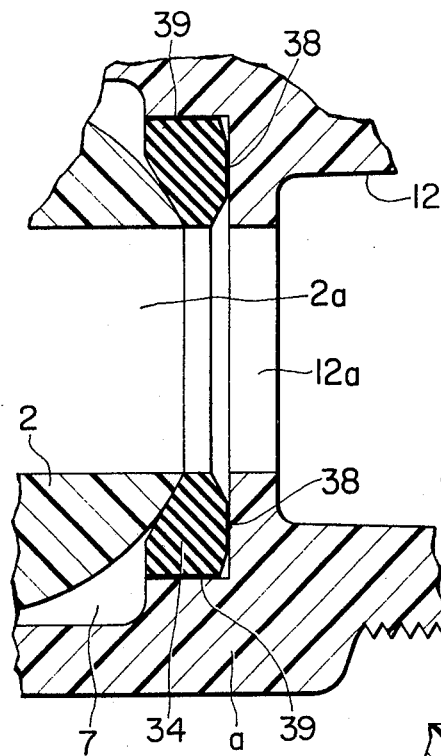
FIG. 4 is a section view of part of the valve assembly, embodying modifications to the valve seat ring.

In the modification shown in FIG. 4, the seat ring is shown at 34 which is held fixedly in a receiving ring recess formed on the valve body as a modification from the ring groove 8 provided in the foregoing. The ring 34 is positioned in a fixed state by the provision of two ring-formed sealing surfaces 38 and 39 positioned perpendicular to each other. By this means, the seat ring can not be subject to alteration in its delicate and floating, yet sufficiently leakpreventing mating condition of valve member and valve seats.

Figure 5:
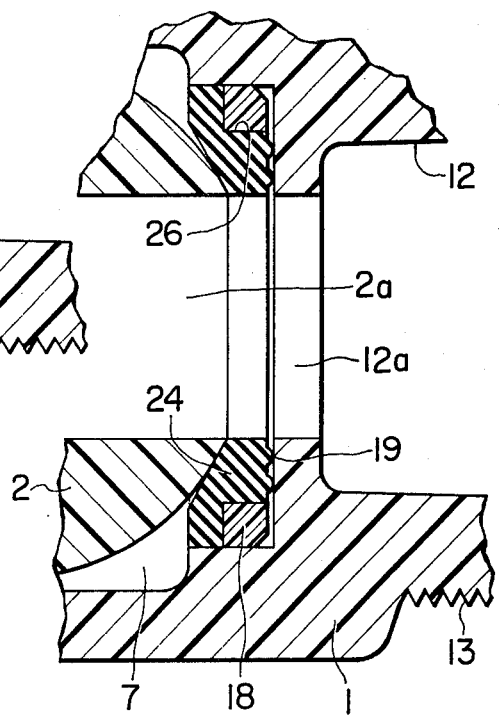
FIG. 5 is a view similar to FIG. 4, showing, however, a further modification of the valve seat ring.

A further slightly modified structure of the valve assembly is shown in FIG. 5. In this modification, the seat ring 24 is formed with a ring recess 26 in which an auxiliary ring 18 is inserted. The latter ring 18 is attached to both the main ring 24 as well as the wall of the recess 26 and thus the valve body. In this way, otherwise possible positional change between valve ball and seat ring and that between seat ring and valve body is positively prevented. The main ring 24 is formed with sealing ring projection 19 adapted for coacting with the radial wall surface of the receiving recess. In this way, a kind of double sealing effect can be assured. The material of auxiliary ring 18 may be synthetic resin, rubber or even metal.

Figure 6:
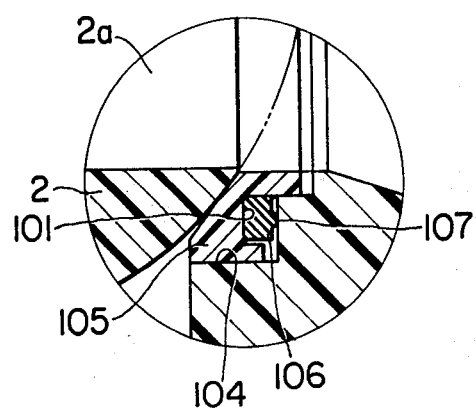
FIGS. 6 and 7 are enlarged, partial and sectional drawings of two most preferable embodiments of the seals employed in the invention.
Figure 7:
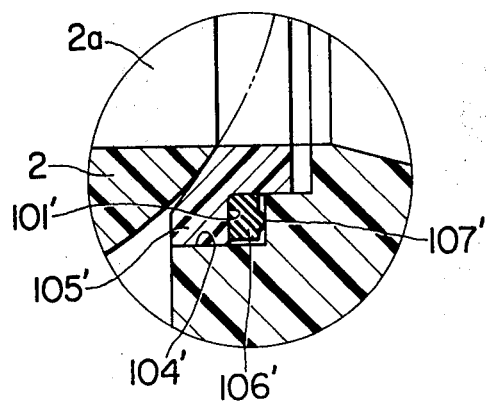

Most effective two embodiments of the valve ball sealing assembly is shown in FIGS. 6 and 7.

In these embodiments, the seal comprises a larger mass portion 105 or 105' made of a hard or semi-hard plastic resin, preferably PTFE, and adapted for contact with the valve ball 2. The seat further comprises a smaller mass portion 106 or 106' made of natural or synthetic rubber and providing a resilient back-up pressure against the said larger portion. These back-up rubber is formed with sealing projection(s) 107 or 107' against the vertical wall portion of the seat 104 or 104' having a shouldered ring shape. These sealing projection(s) provides an excellent sealing effect between the seal and the seat. On account of this provision of resilient back-up means, the sealing effect is further promoted.

Either conveniently selected passage element 10; 10a or 12; 12a of the valve assembly so far shown and described can be utilized for fluid introduction. Since the passage bore 2a formed through the ball valve member 2 is made substantially in registration with the reduced passage portion 10a or 12a in its size and concentricity, and further, thanks to the non-threaded nature at 10 or 12 as well as the provision of outer male screw threads at 11 or 13 provided for pipe connection, the fluid flow may be most throttled at the passage at 2a of the valve ball member. Thus, the flow blocking operation can be brought about in the most efficient and convenience manner.

Although in FIGS. 6 and 7, the sealing projection(s) 107 or 107' is/are seen on the outer vertical surface of the resilient back-up component 106 or 106', they may be provided in the inner vertical surface thereof, although not shown only for simplicity of the drawing.

The embodiment of the invention in which an exclusive property or privilege is claimed are as follows:

1. A disposable ball valve assembly comprising:
   (a) a ball valve member made of a plastic resin material;
   (b) a valve stem made of a plastic resin material and coupled with the said ball valve member;
   (c) a valve body having a valve cavity formed therein for movably mounting said ball valve member, said valve body comprising:
      (1) a first body element made of a plastic resin material and having a portion thereof shaped to define a female connection;
      (2) a second body element made of a plastic resin material and having a portion thereof shaped to define a male connection inserted into said female connection, said first and said second body elements being permanently coupled and rigidly interconnected to each other by said connections with the end of the male connection being spaced from an interior portion of said first body element to define therebetween a valve cavity holding said ball valve member, said first and said second body elements having bores formed therein and said ball valve member being rotatable between a first position in which a bore formed therein permits fluid flow between the bores formed in said body elements and a second position in which said ball valve member blocks fluid flow between the bores formed in said body elements, portions of said body elements defining said valve cavity having ring grooves recessed therein concentric with the bores formed in said body elements, each of said ring grooves having a first circumferential surface extending outwardly from the stepped bore, a first axial surface extending axially inwardly from outer ends of the first circumferential surface towards said valve cavity, a second circumferential surface extending outwardly from an inner end of the first axial surface, and a second axial surface extending axially inward from outer ends of the second circumferential surface; and
   (d) sealing ring means positioned in said ring grooves and sealingly coacting with said ball valve member to prevent fluid flow between said ball valve member and portions of said first and said second body elements defining said valve cavity, said sealing ring means comprising:
      (1) a first composite seat ring positioned in the ring groove formed in said first body element; and
      (2) a second composite seat ring positioned in the ring groove formed in said second body element, each of said composite seat rings having a larger mass portion made of a hard or semi-hard plastic resin material and kept in sealing and direct contact with said ball valve member and a smaller mass portion made of elastomer or rubber and having a hemispherical shaped sealing projection coacting with a surface of the associated ring groove to provide a sealing area that increases as the pressure exerted on the composite seat ring by said ball valve member increases.

2. The ball valve assembly of claim 1, further comprising a handle attached fixedly and in an unseparable manner to top end of said valve stem for providing a complete disposability.

3. The ball valve assembly according to claim 1, wherein each of said larger mass portions of said seat rings have mutually perpendicular sealing surfaces received in said ring grooves.

4. The ball valve assembly according to claim 1, wherein said body elements have first axially extending confronting surfaces extending parallel to an axis of said valve body and second radially extending confronting surfaces extending perpendicular to the axis, said first and second confronting surfaces extending around the entire peripheries of said body elements and being secured to each other by adhesive.

5. The ball valve assembly according to claim 1, wherein walls of said ring grooves contacted by the sealing projections extend perpendicular to an axis of the valve body.

* * * * *